United States Patent
Liu

(10) Patent No.: US 8,069,262 B2
(45) Date of Patent: Nov. 29, 2011

(54) METHOD, SYSTEM AND APPARATUS FOR PLAYING ADVERTISEMENTS

(75) Inventor: Jianqiang Liu, Shenzhen (CN)

(73) Assignee: Tencent Technology (Shenzhen) Company Limited, Shenzhen (KR)

( * ) Notice: Subject to any disclaimer, the term of this patent is extended or adjusted under 35 U.S.C. 154(b) by 289 days.

(21) Appl. No.: 12/341,575

(22) Filed: Dec. 22, 2008

(65) Prior Publication Data

US 2009/0106442 A1 Apr. 23, 2009

Related U.S. Application Data

(63) Continuation of application No. PCT/CN2007/070167, filed on Jun. 22, 2007.

(30) Foreign Application Priority Data

| Jun. 23, 2006 | (CN) | 2006 1 0090101 |
| Aug. 31, 2006 | (CN) | 2006 1 0127648 |
| Mar. 13, 2007 | (CN) | 2007 1 0073502 |

(51) Int. Cl.
*G06F 15/16* (2006.01)

(52) U.S. Cl. ........ 709/231; 709/217; 709/219; 709/203; 725/36; 725/42; 725/105; 725/143; 725/14

(58) Field of Classification Search ........ 709/203, 709/217, 219, 231; 705/14; 725/36, 42, 725/105, 143; 386/249

See application file for complete search history.

(56) References Cited

U.S. PATENT DOCUMENTS

| 6,757,796 B1 * | 6/2004 | Hofmann ............... 711/159 |
| 6,944,185 B2 * | 9/2005 | Patki et al. ............. 370/474 |
| 8,005,345 B2 * | 8/2011 | Haot et al. ............. 386/249 |
| 2002/0138641 A1 * | 9/2002 | Taylor et al. ............ 709/231 |
| 2002/0147634 A1 * | 10/2002 | Jacoby et al. ............ 705/14 |
| 2003/0023973 A1 * | 1/2003 | Monson et al. .......... 725/34 |
| 2004/0078266 A1 * | 4/2004 | Kim ....................... 705/14 |

FOREIGN PATENT DOCUMENTS

| CN | 1275740 A | 12/2000 |
| CN | 1419785 A | 5/2003 |
| CN | 1459066 A | 11/2003 |
| CN | 1475087 A | 2/2004 |
| CN | 1889679 A | 1/2007 |
| EP | 1215605 A1 | 6/2002 |
| JP | 2002189598 A | 7/2002 |
| JP | 2005346626 A | 12/2005 |

OTHER PUBLICATIONS

International Search Report for International Application No. PCT/CN2007/070167, dated Sep. 27, 2007, and English translation thereof. "Walk Into a Flow World"; Computer Fan, 2003; pp. 53-55; and English abstract thereof.
Chinese Office Action for Chinese Patent Application No. 2006101276480; dated Aug. 8, 2008, and English translation thereof.
Chinese Office Action for Chinese Patent Application No. 2007100735027, dated Sep. 5, 2008, and English translation thereof.

* cited by examiner

*Primary Examiner* — Frantz Jean

(57) ABSTRACT

Embodiments of the present invention provide method, system and apparatus for playing advertisements during buffering time in network living broadcasting. The method includes: obtaining, by a network living broadcasting client, streaming media data of a channel currently watched by a user, obtaining an advertisement content file corresponding to the channel, triggering to play the advertisement content file; stopping play the advertisement content file when the amount of the streaming media data retrieved by the network living broadcasting client reaches a pre-determined quantity, and starting to play the streaming media data retrieved. The system includes an advertisement server and a network living broadcasting client.

15 Claims, 8 Drawing Sheets

METHOD, SYSTEM AND APPARATUS FOR PLAYING ADVERTISEMENTS

CROSS-REFERENCE TO RELATED APPLICATIONS

This application is a continuation of International Patent Application No. PCT/CN2007/070167 filed on Jun. 22, 2007. This application claims the benefit and priority of Chinese Patent Application Nos. 200610090101.8, filed Jun. 23, 2006; 200610127648.0, filed Aug. 31, 2006; and 200710073502.7, filed Mar. 13, 2007. The entire disclosures of each of the above applications are incorporated herein by reference.

FIELD

The present invention relates to computer network technologies, and particularly, to method, system and apparatus for playing advertisements.

BACKGROUND

This section provides background information related to the present disclosure which is not necessarily prior art.

Network living broadcasting is a technique on basis of Internet communications for playing streaming media programs (e.g. television programs, radio programs, films and so on) to users in real time. As network transmission techniques and streaming media techniques grow more and more mature, living broadcasting steaming media services provided through high-speed Internet become more and more popular, and large amount of network living broadcasting systems appear, e.g., PPLive, MySee and PPStream, etc. Three parties, i.e., streaming media content providers, network living broadcasting operators and network living broadcasting clients, form the main part of a network broadcasting system.

Before playing a program, a network living broadcasting client needs to retrieve streaming media data from the Internet. After the amount of streaming media data received reaches a pre-determined quantity, the network living broadcasting client triggers to play the program and displays the program to a user. The time from the network living broadcasting client begins to retrieving the streaming media data till the network living broadcasting client triggers to play the program is called buffering time. All the network living broadcasting clients need the buffering time before playing the program. The only different is that the buffering time may be longer or shorter. The buffering time is used for accumulating the streaming media data to ensure the continuity of the program in case of network fluctuation. In the related art, the buffering time is processed in different manners. Hereinafter, the different processing are respectively described.

At present, most network living broadcasting systems do nothing during the buffering time. Specifically, a living broadcast displaying area of the network living broadcasting client is blank during the buffering time. Under the living broadcasting displaying area, prompt information is displayed such as "connecting", percentage of the buffering process, "receiving data", "playing soon", etc. After the buffering process, the blank screen will be replaced with a program screen. This manner has the following disadvantages: since the user is eager to watch the program, he/she may focus on the living broadcasting displaying area and the prompt information during the buffering time. The blank screen may make the user upset, and the precious time when the user is focusing on the screen is wasted.

Still some other network living broadcasting systems at present displays pre-configured materials during the buffering time. The pre-configured materials, such as pictures, cartoons, etc., are installed when the network living broadcasting client is installed. The living broadcasting displaying area of the network living broadcasting client displays the pre-configured materials during the buffering time. This manner can distract the user's attention while the user is waiting and alleviate unhappy feelings. But since the materials were installed when the network living broadcasting client was installed and the materials displayed by the network living broadcasting client are the same each time, the user will still become tired of the materials. Furthermore, the materials displayed in the precious time do not provide any useful information to the user. Thus the buffering time is also not fully used.

SUMMARY

This section provides a general summary of the disclosure, and is not a comprehensive disclosure of its full scope or all of its features.

Embodiments of the present invention provide method, system and apparatus for playing advertisements during buffering time so that a network living broadcasting client may make full use of the buffering time.

Technical schemes provided by the embodiments of the present invention are as follows.

A method for playing advertisements during buffering time in network living broadcasting includes:
retrieving, by a network living broadcasting client, streaming media data of a channel currently watched by a user;
obtaining, by the network living broadcasting client, an advertisement content file corresponding to the channel,
triggering, by the network living broadcasting client, to play the advertisement content file;
stopping, by the network living broadcasting client, playing the advertisement content file when the amount of the streaming media data retrieved by the network living broadcasting client reaches a pre-determined quantity, and starting to play the streaming media data retrieved.

An apparatus for playing advertisement during buffering time in network living broadcasting includes:
a user interface module, adapted to capture an operation instruction sent out by a user;
a media stream retrieving module, adapted to retrieve from a network streaming media data of a channel the user currently selects to watch after a "play" instruction sent by the user is captured by the user interface module;
a playing module, adapted to start to play the streaming media data retrieved when the amount of the streaming media data retrieved by media stream retrieving module reaches a pre-determined quantity;
a storage module, adapted to store advertisement content files corresponding to each channel;
a searching module, adapted to search in the storage module for an advertisement content file according to the channel the user currently selects to watch when the media stream retrieving module starts to retrieve the streaming media data; and
an advertisement playing control module, adapted to call a local player to play the advertisement content file found by the searching module, control the local player to stop playing the advertisement content file when the amount of the streaming media data retrieved by the media stream retrieving module reaches the pre-determined quantity.

A system for playing advertisements during buffering time in network living broadcasting includes: an advertisement server and a network living broadcasting client, wherein the network living broadcasting client is adapted to retrieve streaming media data of a channel currently watched by a user after receiving a "play" instruction, query the advertisement server for a web address of an advertisement content file corresponding to the channel, trigger to play the content of the advertisement content file corresponding to the web address, stop playing the content of the advertisement content file and start to play the streaming media data retrieved when the amount of the streaming media data reaches a pre-determined quantity;

the advertisement server is adapted to store advertisement content files corresponding to each channel, provide the web address of the advertisement content file corresponding to the channel currently watched by the user to the network living broadcasting client when receiving a query request from the network living broadcasting client.

The present invention has the following technical advantages.

According to embodiments of the present invention, during the buffering time before playing a program, a network living broadcasting client searches for an advertisement file corresponding to a channel the user currently selects to watch and triggers to play the advertisement file. Therefore, the buffering process is less boring, which improves service quality perceived by the user and produces advertisement income and commercial benefits for video contents providers and network living broadcasting operators.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Embodiments of the present invention provide method, system, network living broadcasting client and advertisement server for playing advertisements during buffering time of network living broadcasting. The solution provided by embodiments of the invention makes it possible for the network living broadcasting client to play advertisements when media stream data of a network living broadcasting channel are buffered before being displayed. Thus the buffering process when no program is displayed becomes less boring, which not only provides the user with useful information, but also produces advertisement income and commercial values for video content providers and network living broadcasting operators.

The principle, technical solution and merits of the present invention will be described in detail hereinafter with reference to accompanying drawings and embodiments of the present invention.

For simplicity, in the following embodiments of the present invention, the network living broadcasting client is shortened as client, the advertisement server is shortened as server, and the network living broadcasting channel is shortened as channel.

Figure 1:
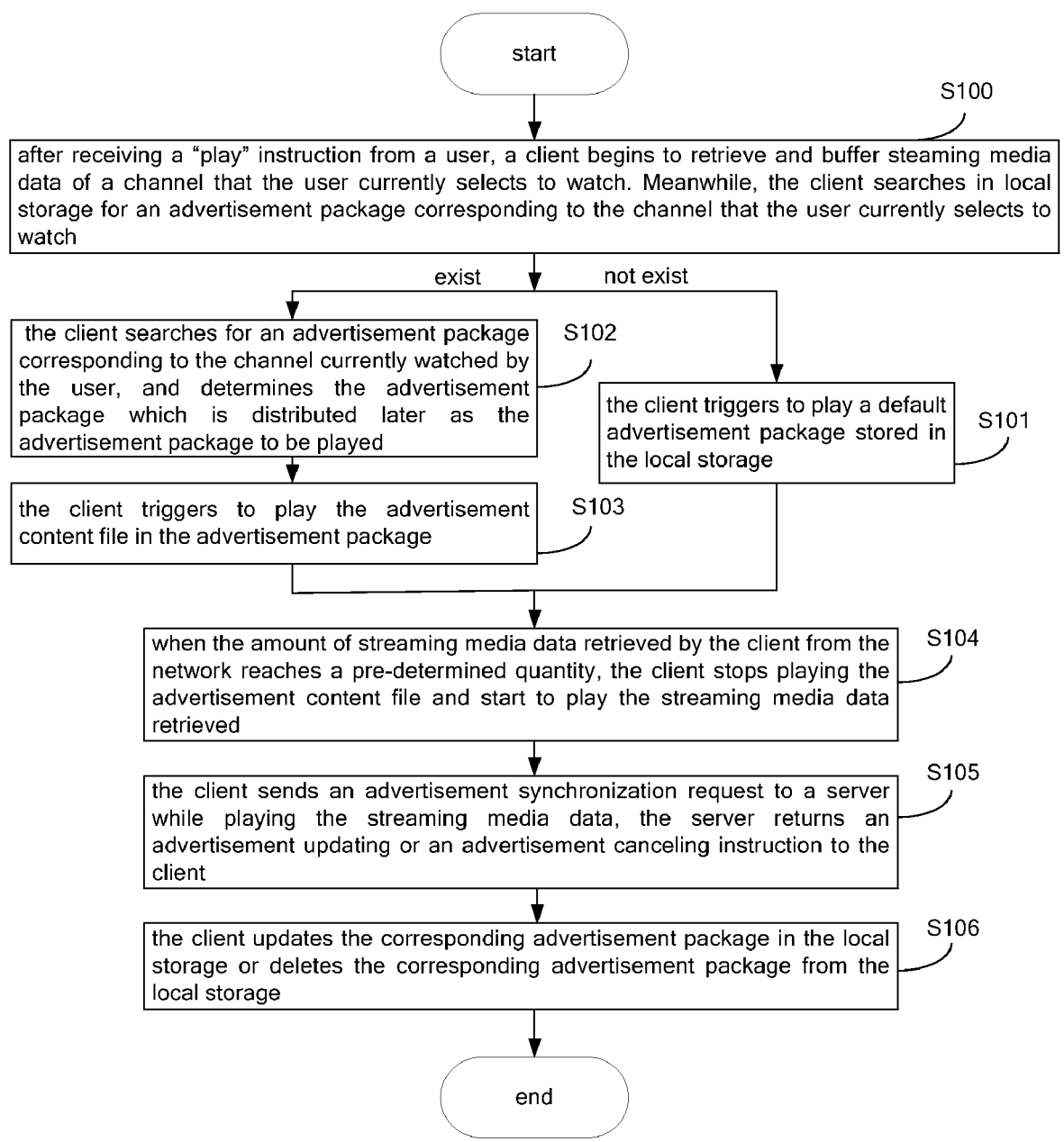
FIG. 1 is a flowchart illustrating a method for playing advertisements during buffering time of network living broadcasting in accordance with a first embodiment of the present invention.

FIG. 1 is a flowchart illustrating a method for playing advertisements during buffering time of network living broadcasting in accordance with a first embodiment of the present invention. The method mainly includes the following steps.

Step S100, after receiving a "play" instruction from a user, a client begins to retrieve and buffer steaming media data of a channel that the user currently selects to watch. Meanwhile, the client searches in local storage for an advertisement package corresponding to the channel that the user currently selects to watch. If there is the advertisement package corresponding to the channel that the user currently selects to watch, proceed to step S102; otherwise, proceed to step S101.

There are generally two kinds of advertisement packages. One is all-channel advertisement package corresponding to all channels. The other is mono-channel advertisement package corresponding to a single channel only. In this way, operators can not only distribute advertisements to all the channels but also distribute advertisements to a specific channel.

The advertisement package may include an advertisement content file and an attribute information file. The advertisement content file may be a webpage file (such as an html file) or a streaming media file. The attribute information file (such as an ini file) is a recording carrier of attributes of the advertisement package. The attribute information file records the attributes of the advertisement package, e.g. distribution time, type and minimum playing time of the advertisement package.

The following is an example showing the content of the attribute information file:

```
[SETTING]
updateTime=1147420410
bAll=1
showtime=10
``` wherein updateTime denotes the distribution time of the advertisement package; bAll indicates whether the advertisement package is an all-channel advertisement package or not, e.g. if bAll=1, it indicates that the advertisement package is an all-channel advertisement package, if bAll=0, it indicates that the advertisement package is a mono-channel advertisement package; showtime denotes the minimum playing time of the advertisement package, wherein the unit of the minimum playing time is second.

On the client side, the advertisement packages may be stored in a following manner.

When installing the client, create a folder for each channel and take an ID of the channel as a name of the corresponding folder. If the advertisement package is a mono-channel advertisement package, the mono-channel advertisement package is stored in the folder of the channel corresponding to the mono-channel advertisement package. If the advertisement package is an all-channel advertisement, the all-channel advertisement package is stored either in the folder of each channel or in a folder on the same level with the folders of the channels.

Step S101, the client searches for a default advertisement package stored in the local storage, and determines whether the type of an advertisement content file in the default advertisement package is supported by the client. If the type is supported by the client, the client plays the advertisement content file; otherwise, the client calls a proper local player to play the advertisement content file in the default advertisement package, then proceeds to step S104.

The default advertisement package is installed when the client was installed.

Preferably, when the client calls the local player to play the advertisement content file in the default advertisement package, a living broadcasting window of the client becomes invisible. A playing window of the local player is displayed at a location where the living broadcasting window was displayed. The size of the playing window may be the same with that of the living broadcasting window of the client.

Step S102, the client searches for an advertisement package corresponding to the channel currently watched by the user. If both an all-channel advertisement package and a mono-channel advertisement package are found, the client reads the attribute information files in the all-channel advertisement package and the mono-channel advertisement package to obtain their respective distribution time, and determines the advertisement package which is distributed later as the advertisement package to be played. If only one of the all-channel advertisement package and the mono-channel advertisement package is found, the client directly determines the found advertisement package as the advertisement package to be played.

Step S103, the client determines whether the type of the advertisement content file in the advertisement package determined in step S102 is supported by the client. If the type is supported by the client, the client plays the advertisement content file in the advertisement package determined in step S102, otherwise, the client calls the local player to play the advertisement content file in the advertisement package determined in step S102.

Preferably, when the client calls the local player to play the advertisement content file in the advertisement package determined in step S102, the living broadcasting window of the client becomes invisible. The playing window of the local player is displayed at a location where the living broadcasting window was displayed. The size of the playing window is the same as that of the living broadcasting window of the client.

Step S104, when the amount of streaming media data retrieved by the client from the network reaches a pre-determined quantity, the client stops playing the advertisement content file and start to play the streaming media data retrieved.

Preferably, when the amount of streaming media data retrieved by the client from the network reaches the pre-determined quantity, the client determines whether the time used for playing the advertisement content file is longer than the minimum playing time specified in the attribute information file. If the time is longer than the minimum playing time, the client stops playing the advertisement content file and starts to play the streaming media data retrieved; otherwise, the client keeps playing the advertisement content file until the time used for playing the advertisement content file reaches the minimum playing time. When the time used for playing the advertisement content file reaches the minimum playing time, the client stops playing the advertisement content file and starts to play the streaming media data retrieved.

Step S105, the client sends an advertisement synchronization request to a server while playing the streaming media data.

The advertisement packages stored in the server are all advertisement packages currently corresponding to the channel. The advertisement packages corresponding to each channel are stored in the server in a following manner.

Create a folder for each channel and take the ID of the channel as a name of the corresponding folder. If the advertisement package is a mono-channel advertisement package, the mono-channel advertisement package is stored in the folder of the channel corresponding to the mono-channel advertisement package. If the advertisement package is an all-channel advertisement, the all-channel advertisement package is stored either in the folder of each channel or in a folder on the same level with the folders of the channels.

While playing the streaming media data, the client sends the advertisement synchronization request to the server, wherein the advertisement synchronization request carries the ID of the channel currently watched by the user and the distribution time of the all-channel advertisement and the mono-channel advertisement which are stored in the local storage and are corresponding to the channel currently watched by the user.

After receiving the advertisement synchronization request, the server checks the distribution time of the all-channel advertisement and the mono-channel advertisement which are stored in the server and are corresponding to the channel currently watched by the user. If there is an advertisement in the server whose distribution time is later than that of the advertisement of the same type in the advertisement synchronization request, the server returns an advertisement updating instruction which specifies the type of the advertisement to be updated to the client. If the distribution time of the advertisement in the server is the same with that of the advertisement of the same type in the advertisement synchronization request, the server returns a no-updating instruction to the client. If no distribution time of the all-channel advertisement or the mono-channel advertisement corresponding to the channel currently watched by the user is found in the server, the server returns an advertisement canceling instruction which specifies the type of advertisement to be canceled to the client.

Step S106, after receiving the advertisement updating instruction, the client obtains the corresponding advertisement package from the server to update the corresponding advertisement package in the local storage. After receiving the advertisement canceling instruction, the client deletes the corresponding advertisement package from the local storage.

When the advertisement package obtained from the server by the client include an all-channel advertisement package, the client updates the all-channel advertisement package in the local storage with the all-channel advertisement package included in the advertisement package obtained from the server. If the all-channel advertisement package in the local storage is stored alone in the folder on the same level with the folders of the channels, the client only needs to update the all-channel advertisement package in the folder. If the all-channel advertisement package in the local storage is stored in the folder of each channel, the client has to update the all-channel advertisement package stored in the folder of each channel respectively.

When the advertisement package obtained by the client includes a mono-channel advertisement package, the client only needs to update the mono-channel advertisement package corresponding to the channel currently watched by the user.

When the advertisement type carried in the advertisement canceling instruction includes the all-channel advertisement, if the all-channel advertisement package in the local storage is stored alone in a folder on the same level with the folders of the channels, the client only needs to delete the all-channel advertisement package in the folder; if the all-channel advertisement package in the local storage is stored in the folder of each channel, the client has to delete the all-channel advertisement package stored in the folder of each channel respectively When the advertisement type carried in the advertisement canceling instruction includes a mono-channel advertisement, the client only needs to delete the mono-channel advertisement corresponding to the channel currently watched by the user.

Through the synchronization process from step S105 to step S106, an advertisement package can be distributed or canceled.

In view of the foregoing, embodiments of the present invention make it possible for the client to play advertisements when buffering data before playing a program. Thus, it is less boring to wait the play of the program during the buffering time and the user's experience is improved. The solution provided by embodiments of the present invention not only provides useful advertisement information for the user but also produces advertisement income and commercial benefits for video contents providers and network living broadcasting operators.

Corresponding to the method for playing advertisements during buffering time of network living broadcasting, embodiments of the present invention further provide a system for playing advertisements during buffering time of network living broadcasting.

Figure 2:
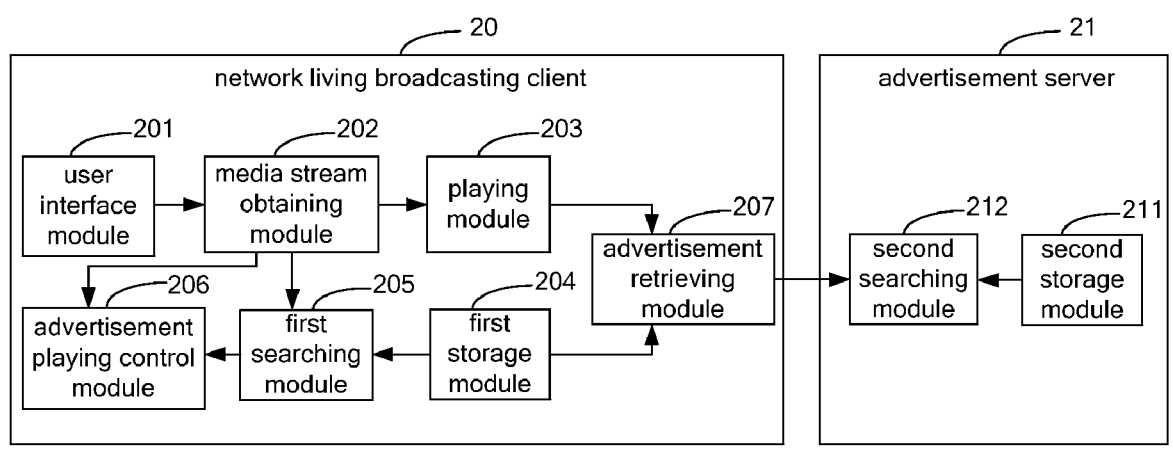
FIG. 2 is a block diagram illustrating the main structure of a system for playing advertisements during buffering time of network living broadcasting in accordance with a second embodiment of the present invention.

FIG. 2 is a block diagram illustrating a main structure of the system for playing advertisements during buffering time of network living broadcasting in accordance with a second embodiment of the present invention. The system includes client 20 and server 21.

Client 20 is adapted to retrieve streaming media data of a channel that currently watched by a user from the network after receiving a "play" instruction, trigger to play an advertisement content file in an advertisement package which is stored in local storage and is corresponding to the channel while obtaining the streaming media data, send an advertisement synchronization request to server 21 while playing the streaming media data to ensure that the advertisement content file corresponding to the channel being synchronized with a corresponding advertisement content file stored in server 30.

Server 21 is adapted to store advertisement packages currently corresponding to each channel, obtain and provide all the advertisement packages which are stored in server 21 and are corresponding to the channel currently watched by the user to client 20 when receiving the advertisement synchronization request from client 20.

Client 20 may include components as follows:

user interface module 201, adapted to capture an operation instruction sent out by the user;

media stream retrieving module 202, connected with user interface module 201, adapted to retrieve and buffer streaming media data of the channel the user currently selects to watch from the network after user interface module 201 captures a "play" instruction sent out by the user;

playing module 203, connected with media stream retrieving module 202, adapted to start to play the streaming media data when the amount of streaming media data buffered by media stream retrieving module 202 reaches a pre-determined quantity;

first storage module 204, adapted to store advertisement packages corresponding to each channel;

first searching module 205, respectively connected with media stream retrieving module 202 and first storage module 204, adapted to search in first storage module 204 for an advertisement package according to the channel the user currently selects to watch when media stream retrieving module 202 starts to retrieve the streaming media data;

advertisement playing control module 206, connected with first searching module 205, adapted to call a proper local player to play an advertisement content file in the advertisement package found by first searching module 205, and control the local player to stop playing the advertisement content file in the advertisement package found by first searching module 205 when the amount of the streaming media data retrieved by media stream retrieving module 202 reaches the pre-determined quantity;

advertisement retrieving module 207, respectively connected with playing module 203 and first storage module 204, adapted to send an advertisement synchronization request to server 21 when playing module 203 plays the streaming media data, search for all advertisement content files stored in server 21 corresponding to the channel currently watched by the user to ensure the advertisement content file of the channel currently watched by the user stored in first storage module 204 being synchronized with a corresponding advertisement content file stored in server 21.

Server 21 includes the following components:

second storage module 211, adapted to store advertisement packages currently corresponding to each channel;

second searching module 212, connected with the advertisement retrieving module 207 of client 20, adapted to obtain all advertisement packages corresponding to the channel currently watched by the user from second storage module 211 according to an advertisement updating request sent by client 20, and send all the advertisement packages to the advertisement retrieving module 207.

In embodiments of the present invention, the advertisement content file of the channel currently watched by the user stored in the local storage of client 20 are ensured to be synchronized with the corresponding advertisement content file stored in server 21 by sending the advertisement synchronization request to server 21 while playing the streaming media data retrieved. The distribution and cancellation of the advertisements are implemented flexibly during the synchronizing process.

Furthermore, the advertisement content files in the embodiments of the present invention have two types, i.e. all-channel advertisement content file and mono-channel advertisement content file. Thus, operators may distribute advertisements to all the channels or to a specific channel only.

Details of other aspects of the system for playing advertisements during buffering time of network living broadcasting can be obtain by referring to the above method provided by the first embodiment of the present invention and will not be repeated herein.

In the above embodiment, the client searches in the local storage for the advertisement package corresponding to the channel the user currently selects to watch. In fact, the client may also obtain the advertisement package corresponding to the channel the user currently selects to watch from the network.

For example, in the technical solution provided by embodiments of the present invention, the client may query the server for a web address of the advertisement content file corresponding to the channel the user currently selects to watch during the buffering process after receiving a "play" instruction from the user, trigger to play the contents of the advertisement content file corresponding to the web address, and stop playing the contents of the advertisement content file and start to play the streaming media data retrieved when the buffering process is finished.

In view of the foregoing, embodiments of the present invention make it possible for the client to play advertisements when buffering data before playing a program. Thus, it is less boring to wait the play of the program during the buffering time and the user's experience is improved. The solution provided by embodiments of the present invention not only provides useful advertisement information for the user but also produces advertisement income and commercial benefits for video contents providers and network living broadcasting operators.

The above solution will be described in detail hereinafter with reference to the accompanying drawings.

Figure 3:
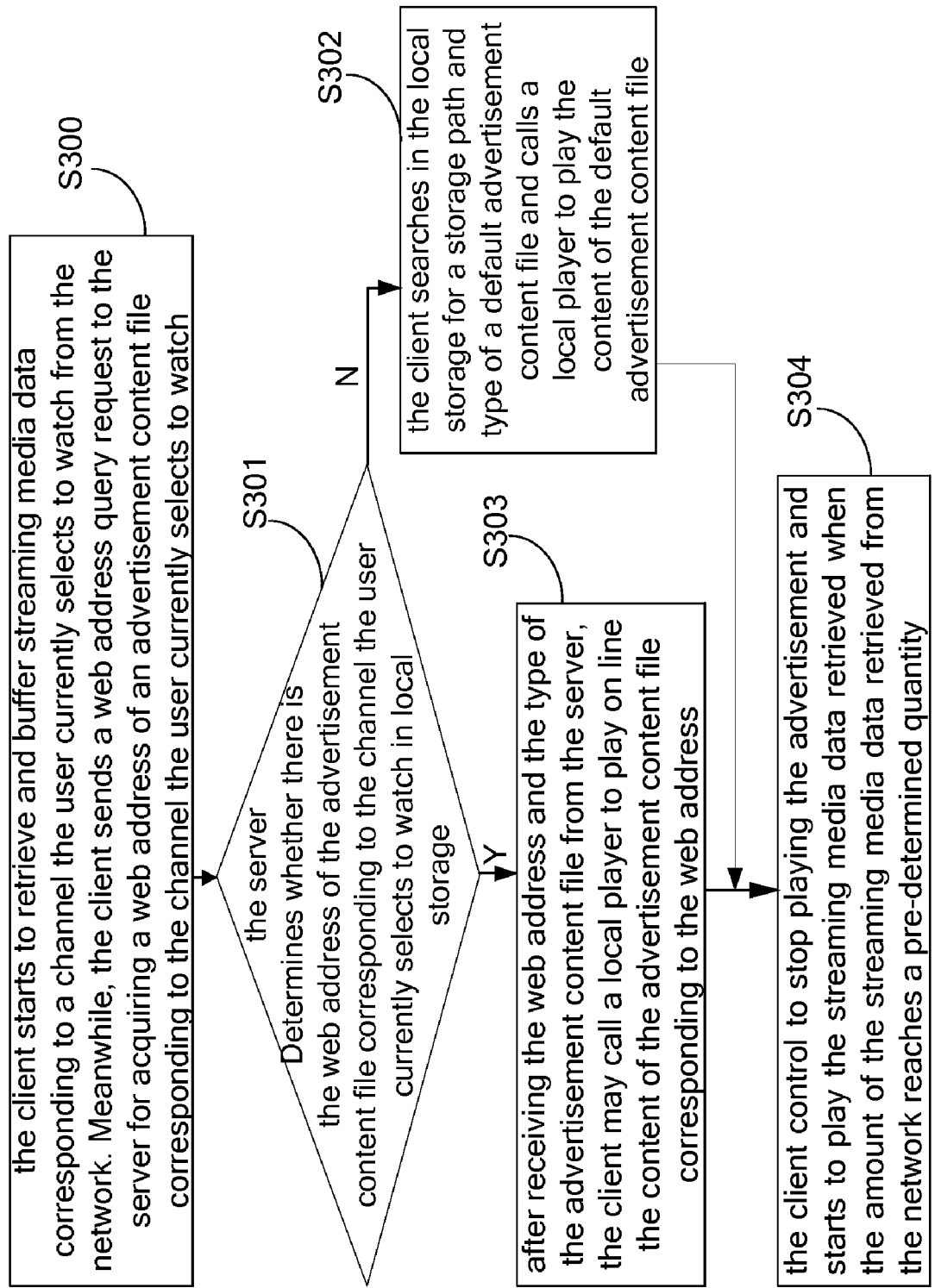
FIG. 3 is a flowchart illustrating a method for playing advertisements during buffering time of network living broadcasting in accordance with a third embodiment of the present invention.

FIG. 3 is a flowchart illustrating a method for playing advertisements during buffering time of network living broadcasting in accordance with a third embodiment of the present invention, which includes the following steps.

Step S300, after receiving a "play" instruction from the user, the client starts to retrieve and buffer streaming media data corresponding to a channel the user currently selects to watch from the network. Meanwhile, the client sends a web address query request to the server for acquiring a web address of an advertisement content file corresponding to the channel the user currently selects to watch.

The web address query request carries an ID of the channel the user currently selects to watch.

Step S301, after receiving the web address query request from the client, the server searches in local storage for the web address of the advertisement content file corresponding to the channel the user currently selects to watch. If the web address of the advertisement content file corresponding to the channel the user currently selects to watch is found, the server returns the web address and type information of the advertisement content file to the client, then performs S303; if the web address of the advertisement content file corresponding to the channel the user currently selects to watch is not found, the server returns prompt information to the client prompting that there is no web address of the advertisement content file corresponding to the channel the user currently selects to watch, and performs S302.

The advertisement content file stored in the server may be an all-channel advertisement content file corresponding to all channels or a mono-channel advertisement content file corresponding to a single channel only. Preferably, the server stores not only the all-channel advertisement content file corresponding to all channels but also the mono-channel advertisement content file corresponding to a single channel only.

When the server stores both the all-channel advertisement content file and the mono-channel advertisement content file, a playing status flag is set in the server for indicating the current playing status which is either an all-channel playing status or a mono-channel playing status. When the playing status flag indicates that it is in the all-channel playing status, the server returns the web address of the all-channel advertisement content file to the client after receiving the web address query request from the client. When the playing status flag indicates that it is in the mono-channel playing status, the server returns the web address of the mono-channel advertisement content file to the client after receiving the web address query request from the client.

The advertisement content files may be stored in the server in the following manner.

Create a folder for each channel and take the ID of the channel as a name of the corresponding folder. If the advertisement package is a mono-channel advertisement package, the mono-channel advertisement package is stored in the folder of the channel corresponding to the mono-channel advertisement package. If the advertisement package is an all-channel advertisement, the all-channel advertisement package is stored either in the folder of each channel or in a folder on the same level with the folders of the channels.

The advertisement content file in the server may be stored in a webpage type or a streaming media data type. If the advertisement content file is of the webpage type, the advertisement content file must include a webpage file (such as an html file) and an attribute information file. If the advertisement content file is of the streaming media data type, the advertisement content file must include a streaming media file and an attribute information file. The attribute information file (such as an ini file) is the recording carrier of attribute information of the advertisement content file. The attribute information may include type and minimum playing time of the advertisement content file. The advertisement content file of the webpage type may further include a FLASH file and a picture file, wherein the FLASH file is embedded in the webpage and carries the content of the advertisement, and the picture file is used for decorating the webpage.

Preferably, besides searching in the local storage for the web address and the type information of the advertisement content file corresponding to the channel the user currently selects to watch after receiving the web address query request from the client, the server may further search for a minimum playing time of the advertisement content file and return the minimum playing time to the client together with the web address and the type information of the advertisement content file.

Step S302, if not receiving a response from the server within a pre-determined time period or when receiving prompt information prompting that no web address of the advertisement content file is found corresponding to the channel the user currently selects to watch after sending the web address query request, the client searches in the local storage for a storage path and type of a default advertisement content file and calls a local player to play the content of the default advertisement content file, and performs step S304.

The default advertisement content file is installed when the client is installed, and may be in the webpage type or the streaming media data type. If the default advertisement content file is of the webpage type, the client sends the storage path of the advertisement content file to a browser (such as Internet Explorer) to make the browser play the content of the default advertisement content file. If the default advertisement content file is of the streaming media data type, the client sends the storage path of the advertisement content file to a streaming media player (such as Windows Mediaplayer) to make the streaming media player play the contents of the default advertisement content file.

When the client calls a local player to play the content of the advertisement content file, the living broadcasting window of the client becomes invisible, and the playing window of the local player is displayed at a location where the living broadcasting was displayed. The size of the playing window of the local player is the same as that of the living broadcasting window of the client.

Preferably, the client may searches in the local storage for the minimum playing time of the default advertisement content file when searching for the storage path and the type of the default advertisement content file.

Step S303, after receiving the web address and the type of the advertisement content file from the server, the client may call a local player to play on line the content of the advertisement content file corresponding to the web address, and perform step S304.

When the type of the advertisement content file indicates that the advertisement content file corresponding to the channel the user currently selects to watch is a webpage, the client sends the web address of the advertisement content file to a browser (such as Internet Explorer) to make the browser play the content of the advertisement content file on line. When the type of the advertisement content file indicates that the advertisement content file corresponding to the channel the user currently selects to watch is streaming media data, the client sends the web address of the advertisement content file to a streaming media player (such as Windows Mediaplayer) to make the streaming media player play the content of the advertisement content file on line.

When the client calls a local player to play on line the content of the advertisement content file corresponding to the web address, the living broadcasting window of the client becomes invisible, and the playing window of the local player is displayed at a location where the living broadcasting was displayed. the size of the playing window of the local player is the same as that of the living broadcasting window of the client.

Step S304, the client control to stop playing the advertisement and starts to play the streaming media data retrieved when the amount of the streaming media data retrieved from the network reaches a pre-determined quantity.

When the advertisement played by the client is a default advertisement installed in the local storage, and the client has acquired in step S302 the minimum playing time of the default advertisement content file when acquiring the storage path and the type of the default advertisement content file, the client determines whether the time used for playing the advertisement is longer than the minimum playing time when the amount of streaming media data retrieved by the client from the network reaches the pre-determined quantity. If the time is longer than the minimum playing time, the client stops playing the advertisement content file and starts to play the streaming media data retrieved; otherwise, keeps on playing the advertisement content file until the time used for playing the advertisement content file reaches the minimum playing time. When the time used for playing the advertisement content file reaches the minimum playing time, the client stops playing the advertisement content file and starts to play the streaming media data retrieved.

When the advertisement played by the client is a default advertisement installed in the local storage and the minimum playing time of the advertisement content file is included in the information returned by the server to the client in step S303, the client determines whether the time used for playing the advertisement is longer than the minimum playing time when the amount of streaming media data retrieved by the client from the network reaches the pre-determined quantity. If the time is longer than the minimum playing time, the client stops playing the advertisement content file and starts to play the streaming media data retrieved; otherwise, the client keeps on playing the advertisement content file until the time used for playing the advertisement content file reaches the minimum playing time. When the time used for playing the advertisement content file reaches the minimum playing time, the client stops playing the advertisement content file and starts to play the streaming media data retrieved.

In the above embodiment, when the server desires to update the all-channel advertisement content file stored in the server, if the all-channel advertisement content file is stored alone in the folder on the same level with the folders of the channels in the server, the server only needs to update the all-channel advertisement content file in the folder and set the playing status as all-channel playing status; if the all-channel advertisement content file is stored in the folder of each channel, the server has to update the all-channel advertisement content file stored in the folder of each channel respectively and set the playing status as all-channel playing status.

When the server desires to update the mono-channel advertisement content file stored in the server, the server updates the mono-channel advertisement content file in the folder of the specified channel and sets the playing status as mono-channel playing status.

When the server desires to delete the all-channel advertisement content file stored in the server, if the all-channel advertisement package is stored alone in the folder on the same level with the folders of the channels in the server, the server only needs to delete the all-channel advertisement package in the folder and set the playing status as mono-channel playing status; if the all-channel advertisement package is copied into the folders of each channel, the server has to delete the all-channel advertisement package stored in the folders of each channel respectively and set the playing status as mono-channel playing status.

When the server desires to delete a mono-channel advertisement content file stored in the server, the server deletes the mono-channel advertisement content file in the folder of the specified channel.

Embodiments of the present invention make it possible for the client to play advertisements when buffering data before playing a program. Thus, it is less boring to wait the play of the program during the buffering time and the user's experience is improved. The solution provided by embodiments of the present invention not only provides useful advertisement information for the user but also produces advertisement income and commercial benefits for video contents providers and network living broadcasting operators.

Corresponding to the above method for playing advertisements during buffering time of network living broadcasting, embodiments of the present invention further provide a system for playing advertisements during buffering time of network living broadcasting.

Figure 4:
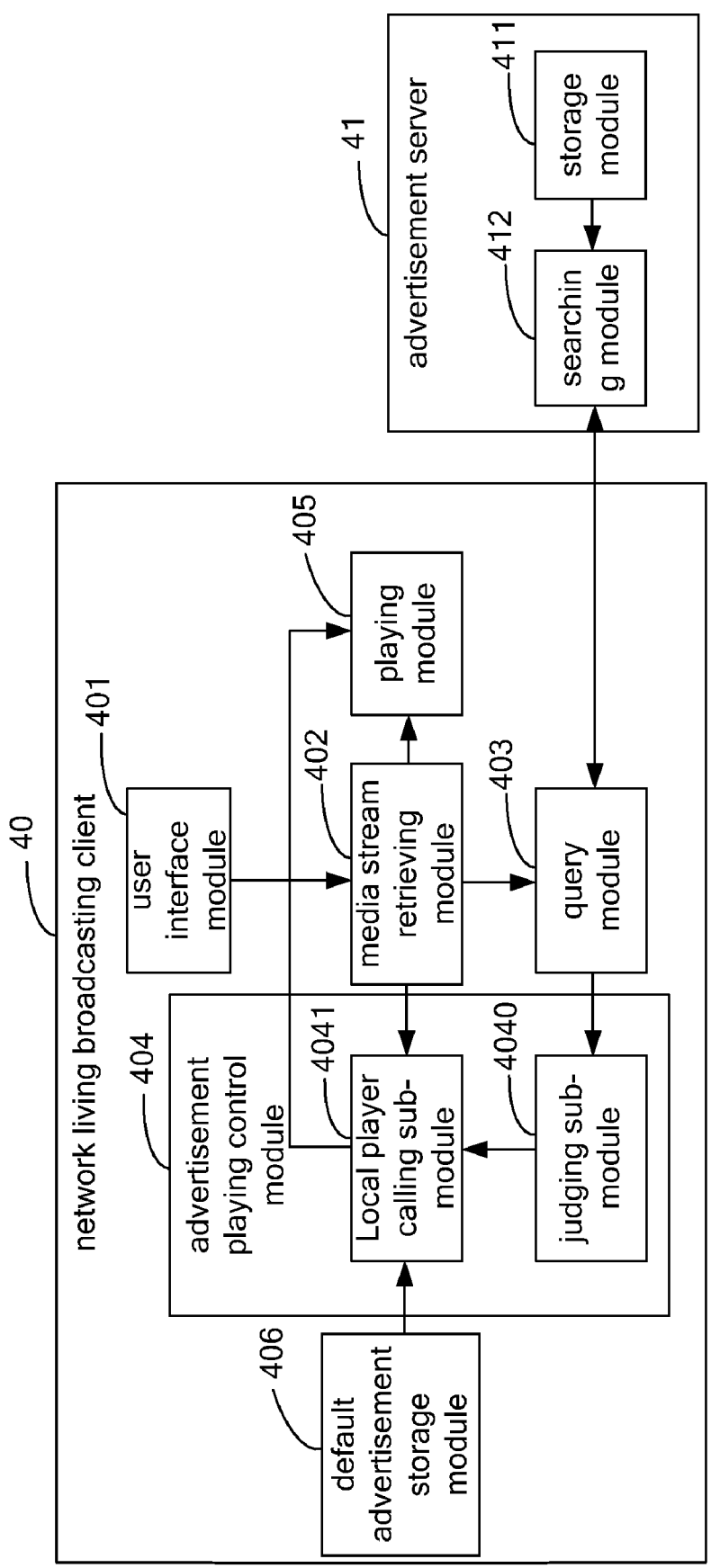
FIG. 4 is a block diagram illustrating the main structure of a system for playing advertisements during buffering time of network living broadcasting in accordance with a fourth embodiment of the present invention.

FIG. 4 is a block diagram illustrating a main structure of a system for playing advertisements during buffering time of network living broadcasting in accordance with a fourth embodiment of the present invention. The system includes client 40 and server 41.

The client 40 is adapted to retrieve streaming media data of a channel that currently watched by a user after receiving a "play" instruction, query server 41 for a web address of an advertisement content file corresponding to the channel currently watched by the user, trigger to play the content of the advertisement content file corresponding to the web address, stop playing the content of the advertisement content file and start to play the streaming media data retrieved when the amount of the streaming media data retrieved reaches a pre-determined quantity.

Server 41 is adapted to store the advertisement content file corresponding to the channel, provide the web address of the advertisement content file corresponding to the channel currently watched by the user to client 40 after receiving a query request from client 40.

Client 40 may include components as follows.

user interface module 401, adapted to capture an operation instruction sent out by a user;

media stream retrieving module 402, connected with user interface module 401, adapted to retrieve and buffer the streaming media data of the channel the user currently selects to watch from the network after the user interface module 401 captures a "play" instruction sent out by the user;

query module 403, connected with media stream retrieving module 402, adapted to query server 41 for the web address and a minimum playing time of the advertisement content file corresponding to the channel the user currently selects to watch when media stream retrieving module 402 starts to retrieve the streaming media data;

advertisement playing control module 404, connected with query module 403 and media stream retrieving module 402, adapted to call a proper local player to play the advertisement content file corresponding to the web address acquired by query module 403, and control the local player to stop playing the advertisement content file when the amount of the streaming media data retrieved by media stream retrieving module 402 reaches the pre-determined quantity and the time used for playing the advertisement content file reaches the minimum playing time;

playing module 405, connected with media stream retrieving module 402 and advertisement playing control module 404, adapted to start to play the streaming media data buffered in media stream retrieving module 402 when the amount of streaming media data buffered reaches the pre-determined quantity.

In order to make full use of the buffering time when the server does not provide any advertisement content file corresponding to the channel the user currently selects to watch, client 20 may further include:

default advertisement storage module 406, adapted to store a default advertisement content file in client 40;

advertisement playing control module 404 may further include the following components.

judging sub-module 4040, adapted to judge whether query module 403 has obtained the web page of the advertisement content file corresponding to the channel the user currently selects to watch from server 41;

local player calling sub-module 4041, adapted to call a proper local player to play the content of the advertisement content file corresponding to the web address when query module 403 has obtained the web address of the advertisement content file corresponding to the channel the user currently selects to watch; and call a proper local player to play the default advertisement content file stored in default advertisement storing module 406 when query module 403 has not obtained the web address of the advertisement content file corresponding to the channel the user currently selects to watch.

Server 41 may include the following components;

storage module 411, adapted to store the advertisement content file corresponding to channel currently watched by the user;

searching module 412, adapted to obtain the web address of the advertisement content file corresponding to the channel currently watched by the user from storage module 411 according to the current playing status set in server 41 after receiving the query request from client 40, and provide the web address to client 40.

Details of other aspects of the system for playing advertisements during buffering time of network living broadcasting can be obtain by referring to the above method provided by the third embodiment of the present invention and will not be repeated herein.

Those skilled in the art may make numerous changes and variations on the solution of the present invention without departing from the spirit and scope thereof. Accordingly, it is intended that the present invention includes the changes and variations in case that such changes and variations come within the scope as set forth in the appended claims and the equivalent techniques thereof.

In addition, as stated above, before playing a program, a network living broadcasting software needs to obtain the stream media data from the Internet. When the amount of the stream media data reaches the pre-defined quantity, the network living broadcasting software starts to play and displays to the user. During the time period from starting receiving the stream media data to displaying a first frame to the user, the process of the client retrieving and buffering the stream media data is called buffering. And the buffering process exists for any network playing software before displaying a program.

The only different is that the buffering time may be different. The advertisements played during the buffering time are called buffering advertisements. Content of the buffering advertisement exists as an advertisement content file. Hereinafter, the buffering advertisement is shortened as advertisement for simplicity.

Embodiments of the present invention also provide an advertisement content file which integrates contents of a plurality of advertisements. Thus, a plurality of advertisements may be displayed during the buffering time. Therefore, the probability of repetition of one advertisement is greatly reduced. In addition, in order to avoid that the advertisement content file always begins from a same advertisement each time being played, embodiments of the present invention further provide a method for playing advertisements during buffering time of network living broadcasting, wherein the playing process is flexibly controlled.

According to an embodiment of the present invention, the server generates a playing index file according to customized information reported by the user. The playing index file may include playing attributes of an advertisement content file and a corresponding relationship between the advertisement content file and a channel. After downloading the playing index file and the advertisement content file from the server, the client generates an advertisement playing queue for each channel according to the playing index file, determines a playing policy, and plays the advertisement content file according to a starting point and a playing order in the playing policy. Thus, the flexibility of playing the advertisement content file is improved.

Figure 5:
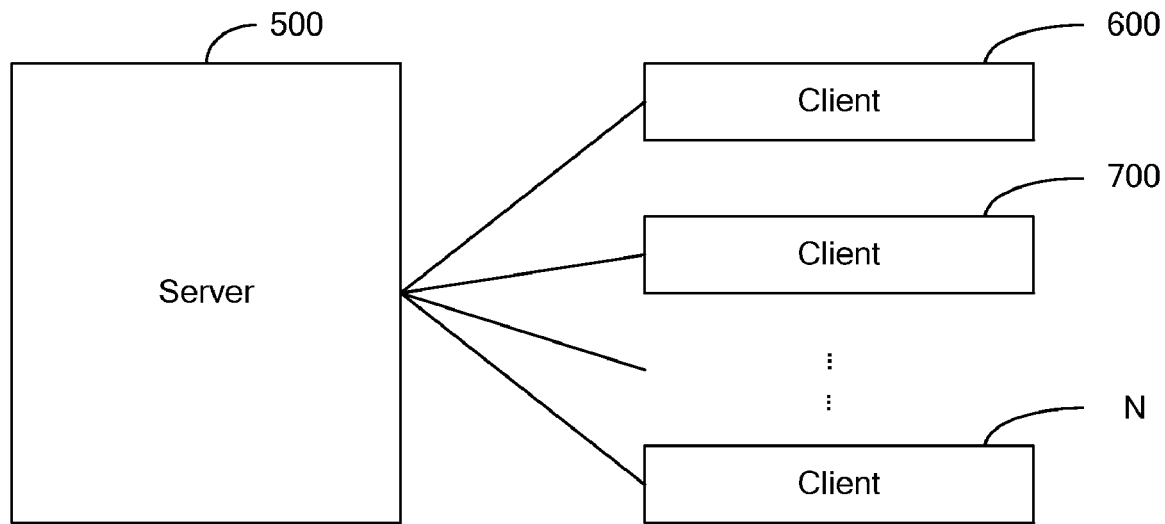
FIG. 5 is a block diagram illustrating the structure of a system for playing advertisements in turn in network living broadcasting in accordance with a fifth embodiment of the present invention.

FIG. 5 is a block diagram illustrating a structure of a system for playing advertisements in turn in network living broadcasting in accordance with a fifth embodiment of the present invention. The system includes server 500 and a plurality of clients (client 600, client 700 . . . client N) connected with server 500. It should be noted that the connections illustrated in all the Figures of the present invention are only used for clearly presenting information interactions and control process therein. Thus the connections should be regarded as logical connections, and are not limited to physical connections.

Server 500 is adapted to distribute advertisements to each channel, store the advertisements as advertisement content files, and generate an advertisement index file based on customized data reported by the clients. Typically, server 500 may be a dedicated advertisement servo or a large scale website server with advertisement servo capabilities. Therefore, the protection scope of the present invention should not be limited by the type of the server.

Each client (client 600, client 700 . . . client N) is connected with server 500, and adapted to download the advertisement content files and the advertisement index file from server 500, control the play of the advertisement content files according to the advertisement index file. Typically, the client may be any kind of terminal capable of playing video or picture, such as Personal Computer (PC), Personal Digital Assistant (PDA), Mobile Phone (MP) and so on. Therefore, the protection scope of the present invention should not be limited by the type of the client.

Figure 6:
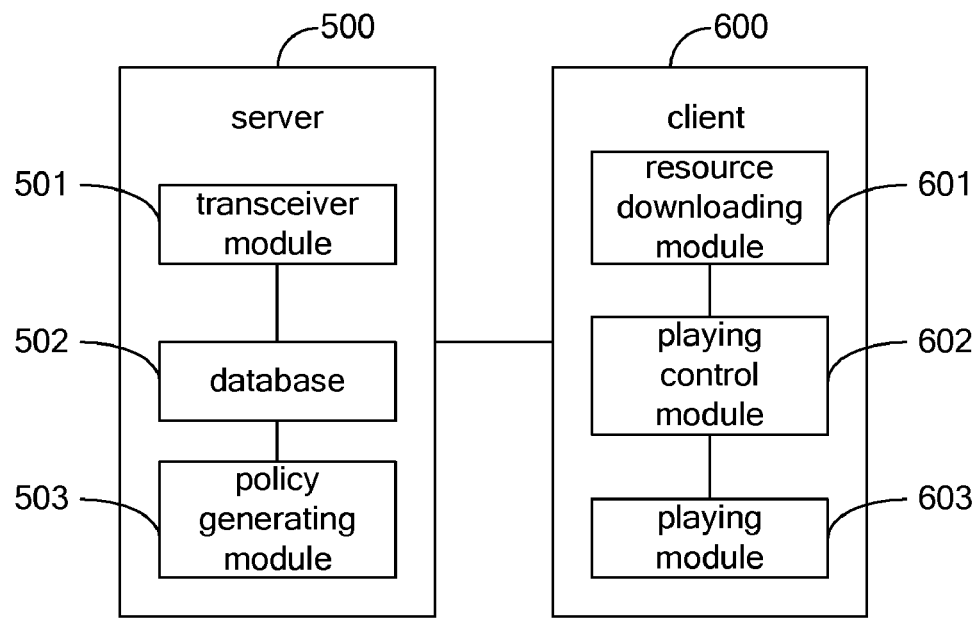
FIG. 6 is a block diagram illustrating the structure of a system for playing advertisements in turn in network living broadcasting in accordance with a sixth embodiment of the present invention.

FIG. 6 is a block diagram illustrating a structure of a system for playing advertisements in turn in network living broadcasting in accordance with a sixth embodiment of the present invention. The system includes server 500 and client 600. This system is the simplest one provided by embodiments of the present invention.

Server 500 includes transceiver module 501, database 502 and policy generating module 503, wherein (1) transceiver module 501 is connected with database 502 and policy generating module 503, and is adapted to exchange messages with client 600, e.g., receive various customized data reported by client 600 and forward the customized data to database 502 and policy generating module 503 for processing, receive a resource downloading request from client 600, obtain resources from database 502 and policy generating module 503 and send the resources to client 600, and so on. In the present invention, the resources stored in database 502 are the advertisement content files. The resources in policy generating module 503 are the advertisement index file generated dynamically in response to the request of client 600.

(2) Database 502 is connected with transceiver module 501 and policy generating module 503, and is adapted to store the advertisement content files.

In an embodiment of the present invention, database 502 stores the advertisements as advertisement content files, and each advertisement content file may include a plurality of advertisements.

(3) policy generating module 503 is connected with database 502 and transceiver module 501, and is adapted to generate the advertisement index file based on the customized data received by transceiver module 501 from client 600, and send the advertisement index file to client 600. The advertisement index file generated by policy generating module 503 may include playing attributes of the advertisement content file and a corresponding relationship between the advertisement content file and the channel.

In an embodiment of the present invention, the corresponding relationship between the advertisement content file and the channel may be a multiple-to-multiple relationship, i.e. one advertisement may be distributed in a plurality of channels, and each channel may also distribute a plurality of advertisements.

In another embodiment of the present invention, the customized data sent by client 600 may include information of the user such as geographical location, age, gender, occupation and so on. Client 600 sends a serial number of the advertisement content file to be played and the customized data of the user to server 500. Then policy generating module 503 determines the playing attributes, such as time, target group and geographical area for playing the advertisement content file.

Client 600 includes resource downloading module 601, playing control module 602 and playing module 603.

(1) resource downloading module 601 is connected with playing control module 602, and adapted to download resources from server 500. Specifically, resource downloading module 601 downloads the advertisement index file from policy generating module 503 and download the advertisement content files from database 502.

(2) playing control module 602 is connected with resource downloading module 601 and playing module 603, adapted to control the playing of the advertisement. Specifically, playing control module 602 arranges the advertisements of a channel in an advertisement content file into an advertisement playing queue according to the advertisement index file downloaded by resource downloading module 601, determines a playing policy for controlling the operation of playing module 603, and determines whether the buffering time is over while playing module 603 playing the advertisements.

In an embodiment, playing control module 602 arranges all advertisements in an advertisement content file into one playing queue.

In another embodiment, playing control module 602 determines authorization information and the time for playing each advertisement in the advertisement content file based on the advertisement playing attributes in the playing index file, and arranges the advertisement content files which are authorized to be played (i.e. the advertisement content files can be played) into one playing queue according to the time for playing each advertisement content file.

(3) playing module 603 is connected with playing control module 602, and is adapted to play the advertisements in the advertisement playing queue one by one under the control of playing control module 602.

Figure 7:
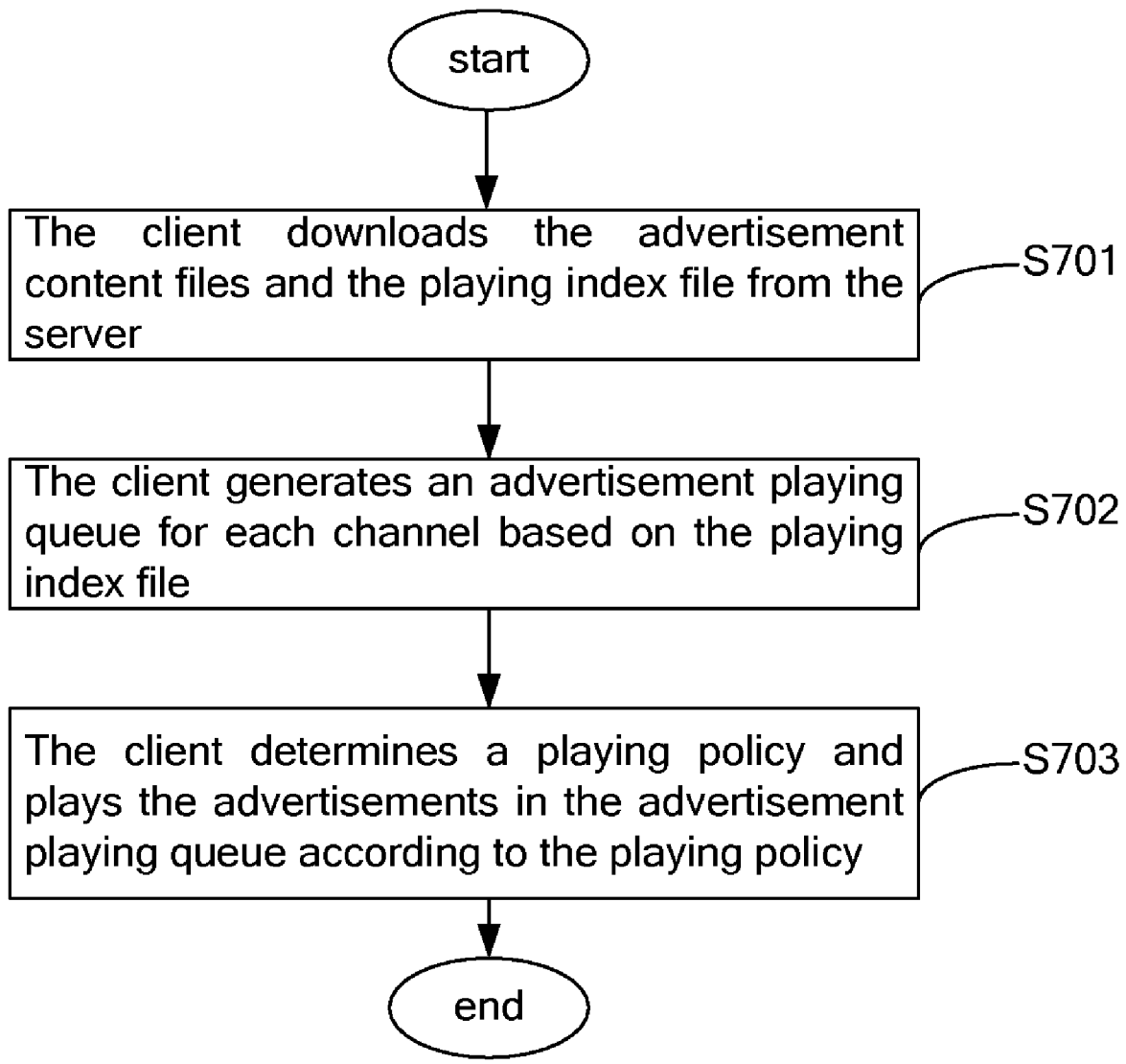
FIG. 7 is a flowchart illustrating a method for playing advertisements in turn in network living broadcasting in accordance with a seventh embodiment of the present invention.

FIG. 7 is a flowchart illustrating a method for playing advertisements in turn in network living broadcasting in accordance with a seventh embodiment of the present invention. The method is based on the system structure shown in FIG. 6 and includes the following steps.

First of all, server 500 stores advertisements in database 502 as advertisement content files, and distributes the advertisement content files using policy generating module 503. The distribution of the advertisement content files accords with the generation of the playing index file. Specifically, after receiving customized data from client 600, server 500 generates the advertisement index file using policy generating module 503, wherein the advertisement index file includes a corresponding relationship between the advertisement content files and the channels and the playing attributes of the advertisement content files. In an embodiment of the present invention, the corresponding relationship between the advertisement content files and the channels may be a multiple-to-multiple relationship. The playing attributes of the advertisement content files include time, target group, geographical area, etc, for playing the advertisement content files.

Step S701, client 600 downloads the advertisement content files and the playing index file from server 500 via resource downloading module 601. In embodiments of the present invention, resource downloading module 601 directly downloads the advertisement content files from database 502 of server 500, and downloads the playing index file from policy generating module 503.

Step S702, client 600 generates an advertisement playing queue for each channel based on the playing index file via playing control module 602.

In an embodiment, playing control module 602 determines authorization information and the time for playing each advertisement in the advertisement content file based on the advertisement playing attributes in the playing index file, and arranges the advertisement content files which are authorized to be played (i.e. the advertisement content files which can be played) into one advertisement playing queue according to the time for playing each advertisement content file.

In another embodiment, the generation of the advertisement playing queue includes: playing control module 602 arranges all advertisements in an advertisement content file into one playing queue. As for whether the advertisements can be played and when the advertisement should be played, they can be checked and determined one by one when playing the advertisements.

Step S703, client 600 further determines a playing policy via playing control module 602, and plays the advertisements in the advertisement playing queue one by one via playing module 603 during the buffering time according to a start point and a playing order in the playing policy until the buffering time is over. In embodiments of the present invention, the playing policy includes the starting point and the playing order. The determination of the playing policy is a process of specifying the starting point and the playing order, which can be implemented through various schemes.

In an embodiment, playing control module 602 firstly determines a priority order of the advertisements in the advertisement playing queue, then determines the starting point and the playing order according to the priority order, i.e. determines the advertisement with the highest priority as the starting point, and determines the advertisement with the second highest priority as the second advertisement to be played, and so on. The priority of each advertisement may be determined by advertisement operators according to practical requirements. Therefore, the solution is suitable for commercial usage.

In another embodiment, playing control module 602 may randomly select an advertisement in the advertisement playing queue as the starting point, and other advertisements are also played in a random order. This approach avoids the situation that some advertisements are scarcely played due to the inadequate of the buffering time. Thus the advertisements may have nearly equal opportunities to be played.

Figure 8:
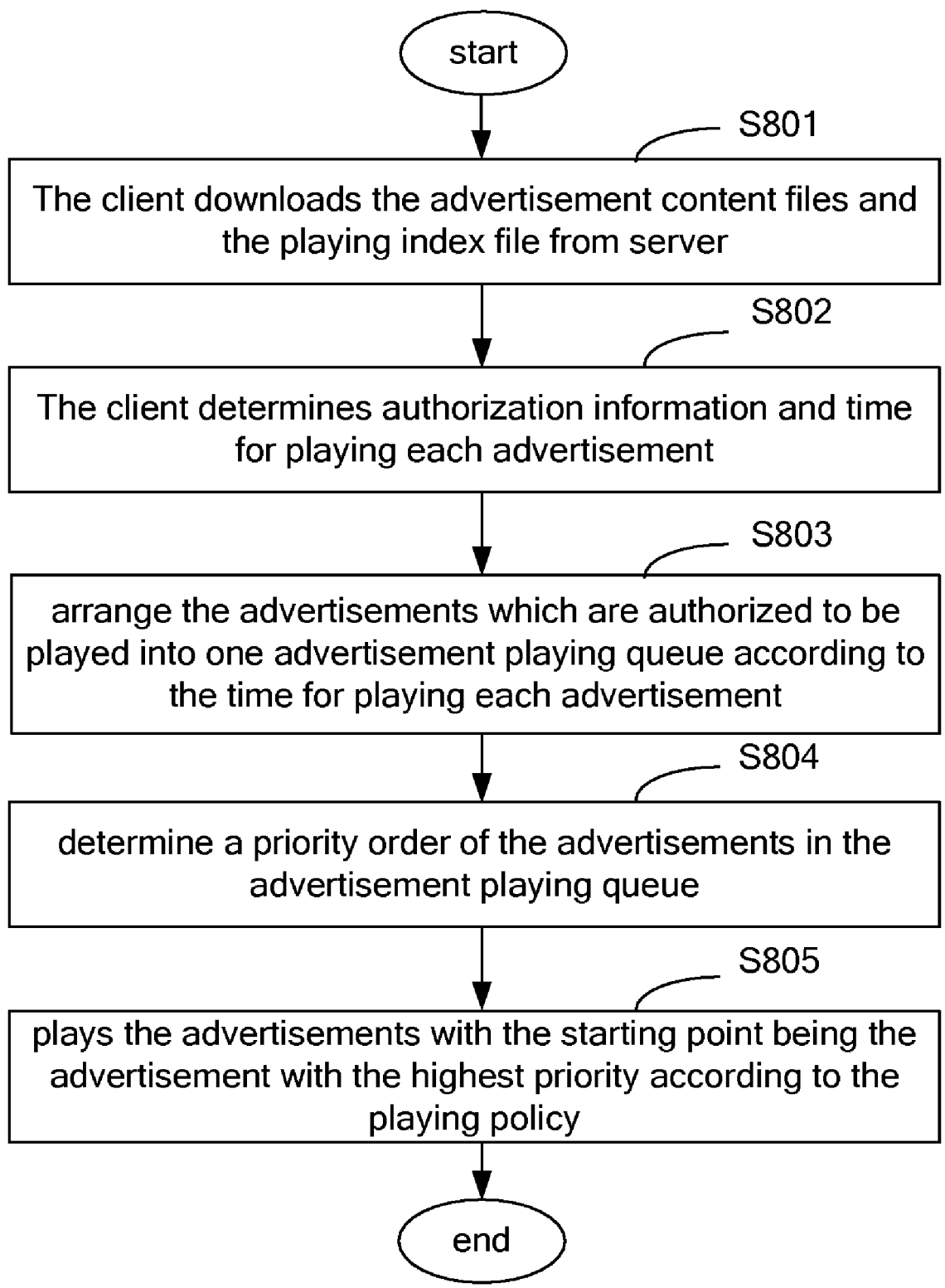
FIG. 8 is a flowchart illustrating a method for playing advertisements in turn in network living broadcasting in accordance with a eighth embodiment of the present invention.

FIG. 8 is a flowchart illustrating a method for playing advertisements in turn in network living broadcasting in accordance with a eighth embodiment of the present invention. The flow is based on the system structure shown in FIG. 6, including the following steps.

First of all, server 500 stores advertisements in database 502 as advertisement content files, and distributes the advertisement content files via policy generating module 503. The distribution of the advertisement content files accords with the generation of the playing index file. Specifically, after receiving customized data from client 600, server 500 generates an advertisement index file via policy generating module 503, wherein the advertisement index file includes playing attributes of the advertisement content files and a corresponding relationship between the advertisement content files and the channels. In an embodiment, the corresponding relationship between the advertisement content files and the channels may be a multiple-to-multiple relationship. The playing attributes of the advertisement content files includes time, target group and geographical area, etc., for playing the advertisement content files.

Step S801, client 600 downloads the advertisement content files and the playing index file from server 500 via resource downloading module 601. In embodiments of the present invention, resource downloading module 601 directly downloads the advertisement content files and the playing index file from server 500.

Step S802, client 600 determines authorization information and time for playing each advertisement in the advertisement content files via playing control module 602 based on the advertisement playing attributes, such as time, target group and geographical area for playing the advertisement content files.

Step S803, client 600 arranges the advertisements which are authorized to be played into one advertisement playing queue via playing control module 602 according to the time for playing each advertisement.

Step S804, playing control module 602 determines a priority order, i.e. an order of importance, of the advertisements in the advertisement playing queue, and determines the playing policy based on the priority order, i.e. determines the advertisement with the highest priority as the starting point, and determines the advertisement with the second highest priority as the second advertisement to be played, and so on.

Step S805, client 600 plays the advertisements via playing module 603 with the starting point being the advertisement with the highest priority according to the playing policy until the buffering time is over.

Figure 9:
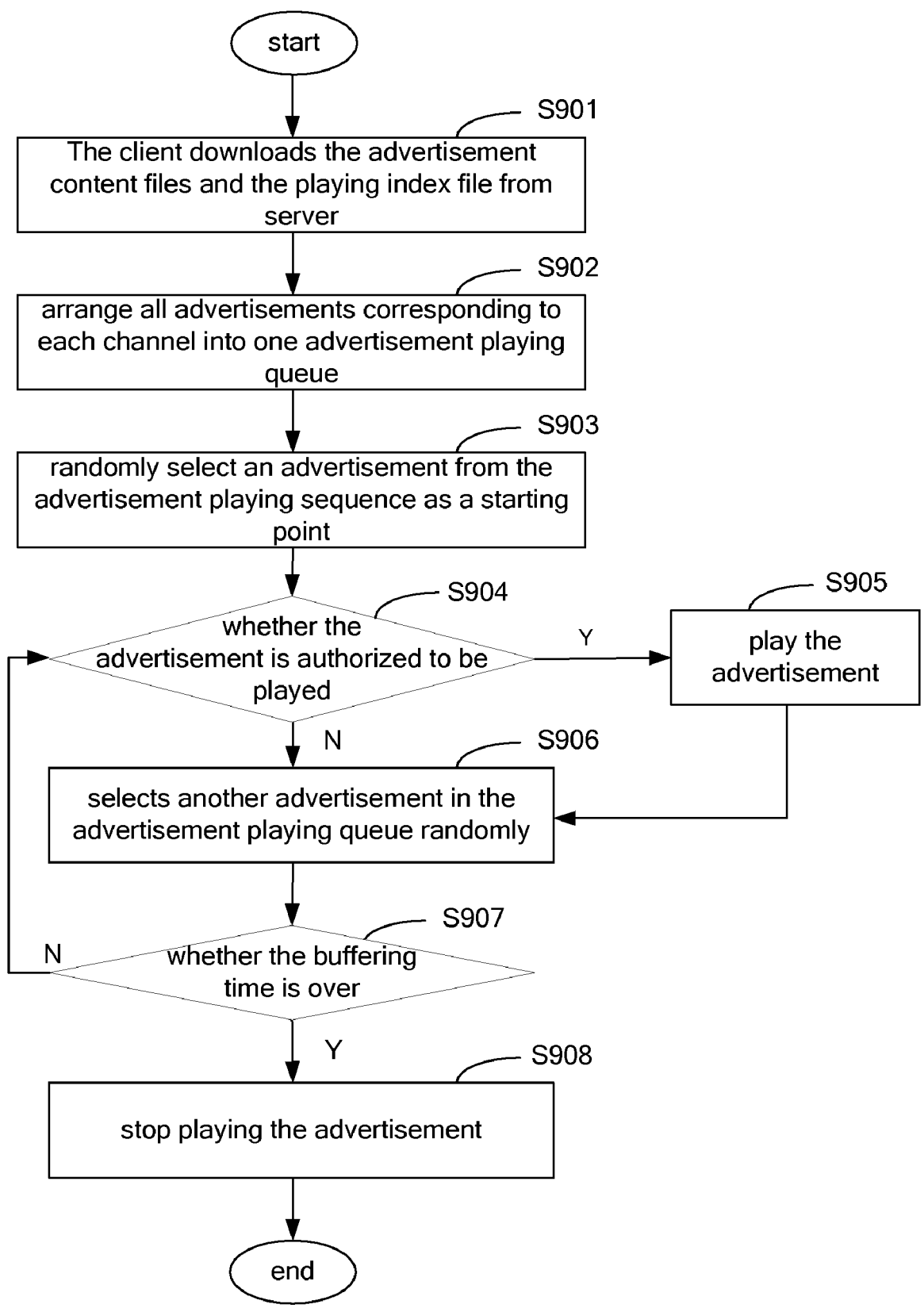
FIG. 9 is a flowchart illustrating a method for playing advertisements in turn in network living broadcasting in accordance with a ninth embodiment of the present invention.

FIG. 9 is a flowchart illustrating a method for playing advertisements in turn in network living broadcasting in accordance with a ninth embodiment of the present invention. The flow is also based on the system structure shown in FIG. 6, including the following steps.

First of all, server 500 stores advertisements in database 502 as advertisement content files, and distributes the advertisement content files via policy generating module 503. The distribution of the advertisement content files accords with the generation of a playing index file. Specifically, after receiving customized data from client 600, server 500 generates an advertisement index file via policy generating module 503, wherein the advertisement index file includes playing attributes of the advertisement content files and the corresponding relationship between the advertisement content files and the channels. In an embodiment, the corresponding relationship between the advertisement content files and the channels may be a multiple-to-multiple relationship. The playing attributes of the advertisement content files includes the time, target group and geographical area for playing the advertisement content files.

Step S901, client 600 downloads the advertisement content files and the playing index file from server 500 via resource downloading module 601.

Step S902, for each channel, client 600 arranges all advertisements corresponding to each channel into one advertisement playing queue via playing control module 602

Step S903, client 600 randomly selects an advertisement from the advertisement playing queue as a starting point.

Step S904, playing control module 602 determines whether the advertisement is authorized to be played according to the playing index file previously downloaded or by querying the server 500 in real time. If the advertisement is authorized to be played, proceed to step S905; otherwise, proceed to step S906.

Step S905, playing module 603 plays the advertisement after determining the advertisement is authorized to be played, and proceeds to step S906 after the advertisement is played.

Step S906, playing control module 602 selects another advertisement in the advertisement playing queue randomly similarly as in step S903.

Step S907, playing control module 602 determines whether the buffering time is over. If the buffering time is over, proceed to step S908; otherwise, return to step S904.

Step S908, if the buffering time is over, playing control module 602 controls playing module 603 to stop playing the advertisements.

The foregoing description is only the preferred embodiments of the present invention and is not for use in limiting the protection scope thereof. All the modifications, equivalent replacements or improvements in the scope of the spirit and principles of the present invention should be included in the protection scope of the present invention.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for playing advertisements during buffering time in network living broadcasting, comprising:

retrieving, by a network living broadcasting client, streaming media data of a channel currently watched by a user;

obtaining, by the network living broadcasting client, an advertisement content file corresponding to the channel, triggering, by the network living broadcasting client, to play the advertisement content file;

stopping, by the network living broadcasting client, playing the advertisement content file when the amount of the streaming media data retrieved by the network living broadcasting client reaches a pre-determined quantity, and starting to play the streaming media data retrieved;

sending, by the network living broadcasting client, an advertisement synchronization request to an advertisement server when playing the streaming media data, wherein the advertisement synchronization request carries distribution time of an all-channel advertisement file and distribution time of a mono-channel advertisement file corresponding to the channel currently watched by the user;

searching, by the advertisement server, in local storage distribution time of all-channel advertisement files and distribution time of mono-channel advertisement files corresponding to the channel currently watched by the user; if there is an advertisement in the advertisement server whose distribution time is later than that of the advertisement of the same type carried in the advertisement synchronization request, sending, by the advertisement server, an advertisement updating instruction to the network living broadcasting client; if there is no distribution time in the advertisement server corresponding to the all-channel advertisement and/or mono-channel advertisement carried in the advertisement synchronization request, sending, by the advertisement server, an advertisement canceling instruction to the network living broadcasting client;

obtaining, by the network living broadcasting client, the corresponding advertisement content file from the advertisement server to update the advertisement content file stored in the network living broadcasting client after receiving the advertisement updating instruction, or deleting the corresponding advertisement content file stored in the network living broadcasting client after receiving the advertisement canceling instruction.

2. The method of claim 1, wherein if there is no advertisement content file corresponding to the channel currently watched by the user, triggering, by the network living broadcasting client, to play a default advertisement content file.

3. The method of claim 1, further comprising:

before stopping playing the advertisement content file, determining, by the network living broadcasting client, whether a time used for playing the advertisement content file reaches a minimum playing time, if the time used for playing the advertisement content file reaches the minimum playing time, stopping, by the network living broadcasting client, playing the advertisement content file.

4. The method of claim 1, wherein the obtaining the advertisement content file corresponding to the channel currently watched by the user and the triggering to play the advertisement content file comprises:

searching, by the network living broadcasting client, all advertisement content files corresponding to the channel currently watched by the user in local storage, and triggering to play an advertisement content file which is most recently distributed.

5. The method of claim 1, wherein the obtaining the advertisement content file corresponding to the channel currently watched by the user and the triggering to play the advertisement content file comprises:
   querying, by the network living broadcasting client, an advertisement server for a web address of the advertisement content file corresponding to the channel currently watched by the user, and
   triggering to play the advertisement content file corresponding to the web address.

6. The method of claim 5, wherein the advertisement server stores an all-channel advertisement content file which is corresponding to all channels and/or a mono-channel advertisement content file which is corresponding to a single channel; when the network living broadcasting client queries the advertisement server for the web address of the advertisement content file, the method further comprising:
   returning, by the advertisement server, the web address of the all-channel advertisement content file or the web address of the mono-channel advertisement content file to the network living broadcasting client according to a playing status currently set in the advertisement server.

7. The method of claim 6, further comprising:
   setting, by the advertisement server, the playing status as playing all-channel advertisement when updating the all-channel advertisement content file stored in the local storage;
   setting, by the advertisement server, the playing status as playing mono-channel advertisement when deleting the all-channel advertisement content file stored in the local storage;
   setting, by the advertisement server, the playing status as playing mono-channel advertisements when updating the mono-channel advertisement content file stored in the local storage.

8. The method of claim 5, wherein the advertisement content file comprises a plurality of advertisements, before the network living broadcast client obtains the advertisement content file corresponding to the channel currently watched by the user, the method further comprising:
   sending, by the network living broadcasting client, customized data to the advertisement server;
   generating, by the advertisement server, a playing index file based on the customized data sent by the network living broadcasting client, and
   sending, by the advertisement server, the advertisement content file comprising the plurality of advertisements and the playing index file to the network living broadcasting client;
   the triggering to the playing of the advertisement content file comprises:
   generating, by the network living broadcasting client, an advertisement playing queue for the channel currently watched by the user according to the playing index file; and
   determining a playing policy by the network living broadcasting client, and playing the advertisements in the advertisement playing queue in turn according to the playing policy during buffering time.

9. The method of claim 8, wherein the playing index file comprises playing attributes of the advertisement content file and the playing attributes of the advertisement content file comprises time, target group and geographical area for playing the advertisement content file.

10. The method of claim 8, wherein the determining the advertisement playing queue comprises:
    determining, by the network living broadcasting client, authorization information and the time for playing each advertisement in the advertisement content file based on a playing attribute of each advertisement in the playing index file;
    arranging, by the network living broadcasting client, the advertisements which are authorized to be played into the advertisement playing queue according to the time for playing each advertisement.

11. The method of claim 8, wherein the playing policy comprises a starting point and a playing order of the advertisement playing queue; the determining the playing policy comprises:
    determining a priority order of the advertisements in the advertisement playing queue, and determining the starting point and the playing order according to the priority order.

12. The method of claim 1, further comprising:
    determining, by the network living broadcasting client, whether the type of the advertisement content file to be played is supported by the network living broadcasting client; if the type of the advertisement content file to be played is supported by the network living broadcasting client, playing, by the network living broadcasting client, the advertisement content file; otherwise, calling, by the network living broadcasting client, a local player to play the advertisement content file.

13. The method of claim 12, wherein when the network living broadcasting client calls the local player to play the advertisement content file, a living broadcasting window of the network living broadcasting client becomes invisible, and a playing window of the local player is displayed at a location where the living broadcasting window of the network living broadcasting client was displayed, and the size of the playing window of the local player is the same as the size of the living broadcasting window of the network living broadcasting client.

14. The method of claim 1, wherein
    if the advertisement content file obtained by the network living broadcasting client includes an all-channel advertisement file, updating, by the network living broadcasting client, the all-channel advertisement stored in the network living broadcasting client with the all-channel advertisement obtained; if the advertisement content file obtained by the network living broadcasting client comprises a mono-channel advertisement file, updating, by the network living broadcasting client, the mono-channel advertisement file stored in the network living broadcasting client with the mono-channel advertisement obtained;
    if the advertisement canceling instruction received indicates to cancel the all-channel advertisement file, deleting, by the network living broadcasting client, the all-channel advertisement stored in the network living broadcasting client; if the advertisement canceling instruction indicates to delete the mono-channel advertisement file, deleting, by the network living broadcasting client, the mono-channel advertisement stored in the network living broadcasting client.

15. The method of claim 1, wherein the advertisement content file is a webpage file or a streaming media file.

\* \* \* \* \*